(12) United States Patent
Siragusa et al.

(10) Patent No.: US 6,464,101 B1
(45) Date of Patent: Oct. 15, 2002

(54) HOLE PLUG WITH MECHANICALLY RETAINED ADHESIVE GASKET

(75) Inventors: George Siragusa, Chicago Heights; Christopher Michael Pangallo, Chicago, both of IL (US)

(73) Assignee: Illinois Tool Works Inc., Glenview, IL (US)

(*) Notice: Subject to any disclaimer, the term of this patent is extended or adjusted under 35 U.S.C. 154(b) by 91 days.

(21) Appl. No.: 09/612,708

(22) Filed: Jul. 10, 2000

(51) Int. Cl.[7] .......................... B65D 39/00; B65D 53/02
(52) U.S. Cl. ..................... 220/795; 220/787; 277/925
(58) Field of Search ................. 220/378, 784, 220/786–788, 789, 790, 795, 803, 804, 806, 305, 601; 215/350, 364; 277/640, 644, 925

(56) References Cited

U.S. PATENT DOCUMENTS

| | | | |
|---|---|---|---|
| 3,062,557 A | * 11/1962 | Underwood | ............... 277/644 |
| 3,948,532 A | 4/1976 | Hopp | |
| 4,192,515 A | 3/1980 | Smith | |
| 4,377,204 A | 3/1983 | Johansson | |
| 4,568,215 A | 2/1986 | Nelson | |
| 4,588,104 A | * 5/1986 | Danico | ........................ 220/787 |
| 4,588,105 A | * 5/1986 | Schmitz et al. | ............. 220/787 |
| 4,783,087 A | 11/1988 | DeCore et al. | |
| 4,823,970 A | 4/1989 | Young | |
| 4,948,096 A | 8/1990 | Alderman | |
| 4,995,455 A | 2/1991 | Mathur | |
| 5,070,939 A | * 12/1991 | Mathur | ........................ 165/166 |
| 5,181,626 A | * 1/1993 | Daenen et al. | .............. 220/789 |
| 5,368,186 A | * 11/1994 | Yeh | ............................. 220/378 |
| 5,525,226 A | * 6/1996 | Brown et al. | ................ 277/644 |
| 5,702,133 A | 12/1997 | Pavur et al. | |
| 5,893,480 A | * 4/1999 | Dore et al. | .................. 220/787 |
| 5,979,683 A | 11/1999 | Kobayashi et al. | |
| 5,996,966 A | 12/1999 | Zimmerly | |

* cited by examiner

Primary Examiner—Nathan J. Newhouse
(74) Attorney, Agent, or Firm—Pitney, Hardin, Kipp & Szuch LLP

(57) ABSTRACT

The hole plug includes a peripheral planar ledge with a wall formed perpendicular therewith. A gasket seats within the intersection of the planar ledge and the wall. The gasket includes inwardly extending tabs (or "dogs") which extend into corresponding pockets (or "doghouses") formed in the wall. This causes the gasket, which is initially provided in a non-tacky state, to be mechanically secured to the hole plug during shipment and assembly prior to installation.

8 Claims, 6 Drawing Sheets

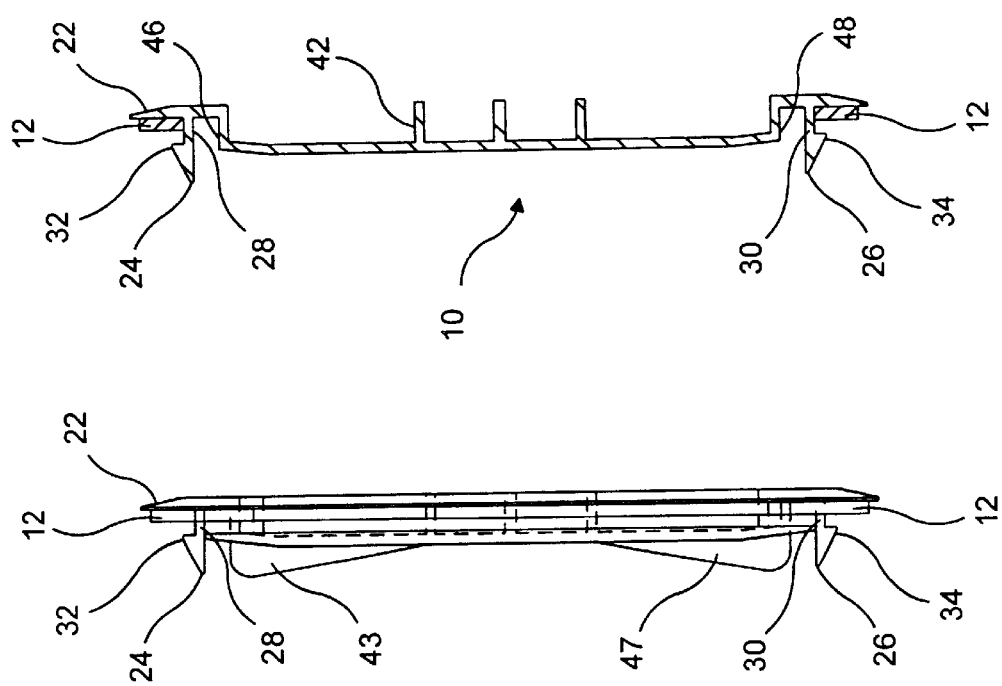
FIG. 4
FIG. 5
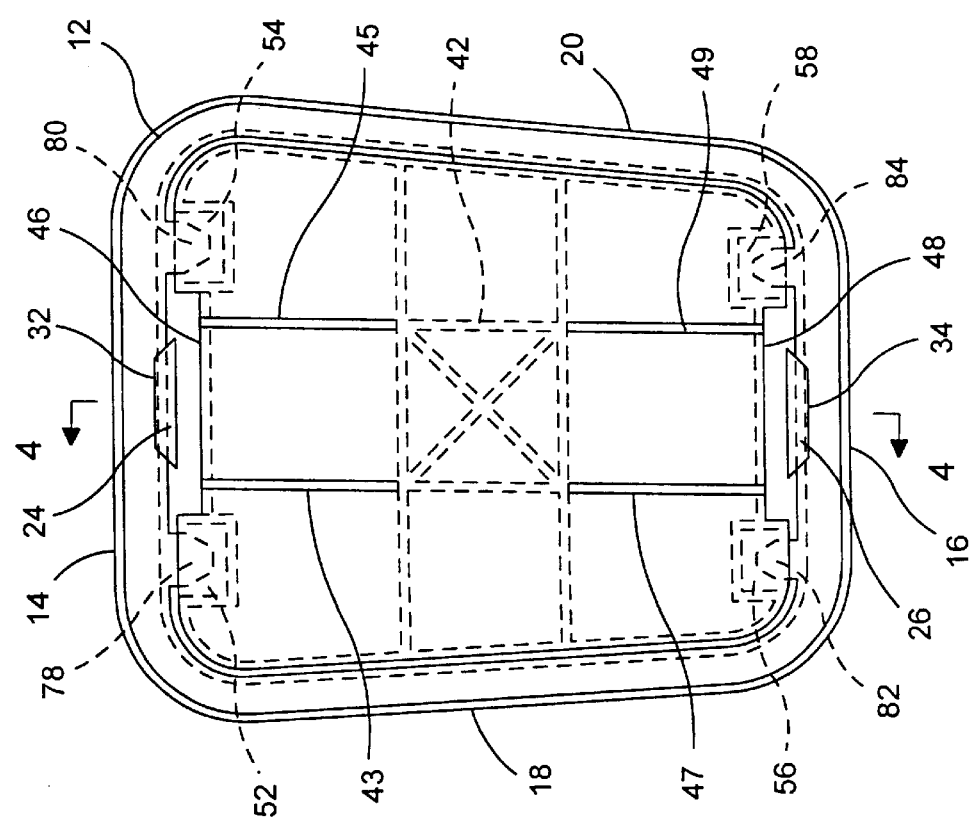
FIG. 3

HOLE PLUG WITH MECHANICALLY RETAINED ADHESIVE GASKET

BACKGROUND OF THE INVENTION

1. Field of the Invention

This invention pertains to a hole plug with a blowing adhesive gasket wherein the hole plug includes cutouts which mechanically retain corresponding protrusions of the blowing adhesive gasket, prior to adhesion of the gasket.

2. Description of the Prior Art

Hole plugs with adhesive seals are known in the prior art.

However, these prior art hole plugs have typically required to blowing adhesive gasket to be adhesively affixed to the hole plug during shipping and assembly. Additionally, improvements in retention between the installed plug and the panel have sometimes been sought.

Some typical examples of prior art, including various gasket applications, include U.S. Pat. No. 5,996,966 entitled "Snap-On Valve Gasket" issued on Dec. 7, 1999 to Zimmerly;

U.S. Pat. No. 5,979,683 entitled "Moulded Cap with a Gasket", issued on Nov. 9, 1999 to Kobayashi et al.; U.S. Pat. No. 5,702,133 entitled "Universal Snap-In Metal Plug" issued on Dec. 30, 1997 to Pavur et al.; U.S. Pat. No. 4,995,455 entitled "Plate Heat Exchanger with Glueless Gaskets" issued on Feb. 26, 1991 to Mathur; U.S. Pat. No. 4,948,096 entitled "Valve Stem and Gasket with Improved Cleaning Capability" issued on Aug. 14, 1990 to Alderman; U.S. Pat. No. 4,823,970 entitled "Gasket Retaining Cap Member and Method of Forming Same" issued on Apr. 25, 1989 to Young; U.S. Pat. No. 4,783,087 entitled "Gasket Assembly Having a Sealing Insert Member and Method of Forming" issued on Nov. 8, 1988 to DeCore et al.; U.S. Pat. No. 4,568,215 entitled "Laterally Adjustable Fastening Assembly" issued on Feb. 4, 1986 to Nelson; U.S. Pat. No. 4,377,204 entitled "Plate Heat Exchanger" issued on Mar. 22, 1983 to Johansson; U.S. Pat. No. 4,192,515 entitled "Gasket Retaining Spring" issued on Mar. 11, 1980 to Smith; U.S. Pat. No. 3,948,532 entitled "Captive Type Sparkplug Gasket" issued on Apr. 6, 1976 to Hopp; and U.S. Pat. No. 3,268,106.

OBJECTS AND SUMMARY OF THE INVENTION

It is therefore an object of the present invention to provide a hole plug wherein the blowing adhesive gasket can be shipped and assembled without the requirement for adhesive attachment to the hole plug.

It is a therefore a further object of the present invention to increase the strength of the adhesive bond between the hole plug and the panel after installation.

These and other objects are attained by providing a hole plug with a blowing adhesive gasket. The hole plug includes openings ("doghouses") while the blowing adhesive gasket assembly includes corresponding protrusions ("dogs") which are inserted into the openings to allow the blowing adhesive gasket assembly to be mechanically retained prior to assembly wherein the blowing adhesive gasket bonds to the hole plug and adjacently to an aperture in a panel. Upon subsequent removal of the hole plug, the blowing adhesive gasket cohesively fails, and the adhesive just outside the openings is sheared between the panel and the bottom of the openings.

BRIEF DESCRIPTION OF THE DRAWINGS

Further objects and advantages of the invention will become apparent from the following description and claims, and from the accompanying drawings, wherein:

FIG. 3 is a plan view, partially in phantom, of the hole plug of the present invention.

FIG. 4 is a cross-sectional view along plane 4—4 of FIG. 3.

FIG. 5 is a side view of the hole plug of the present invention.

DETAILED DESCRIPTION OF THE PREFERRED EMBODIMENT

Figure 1:
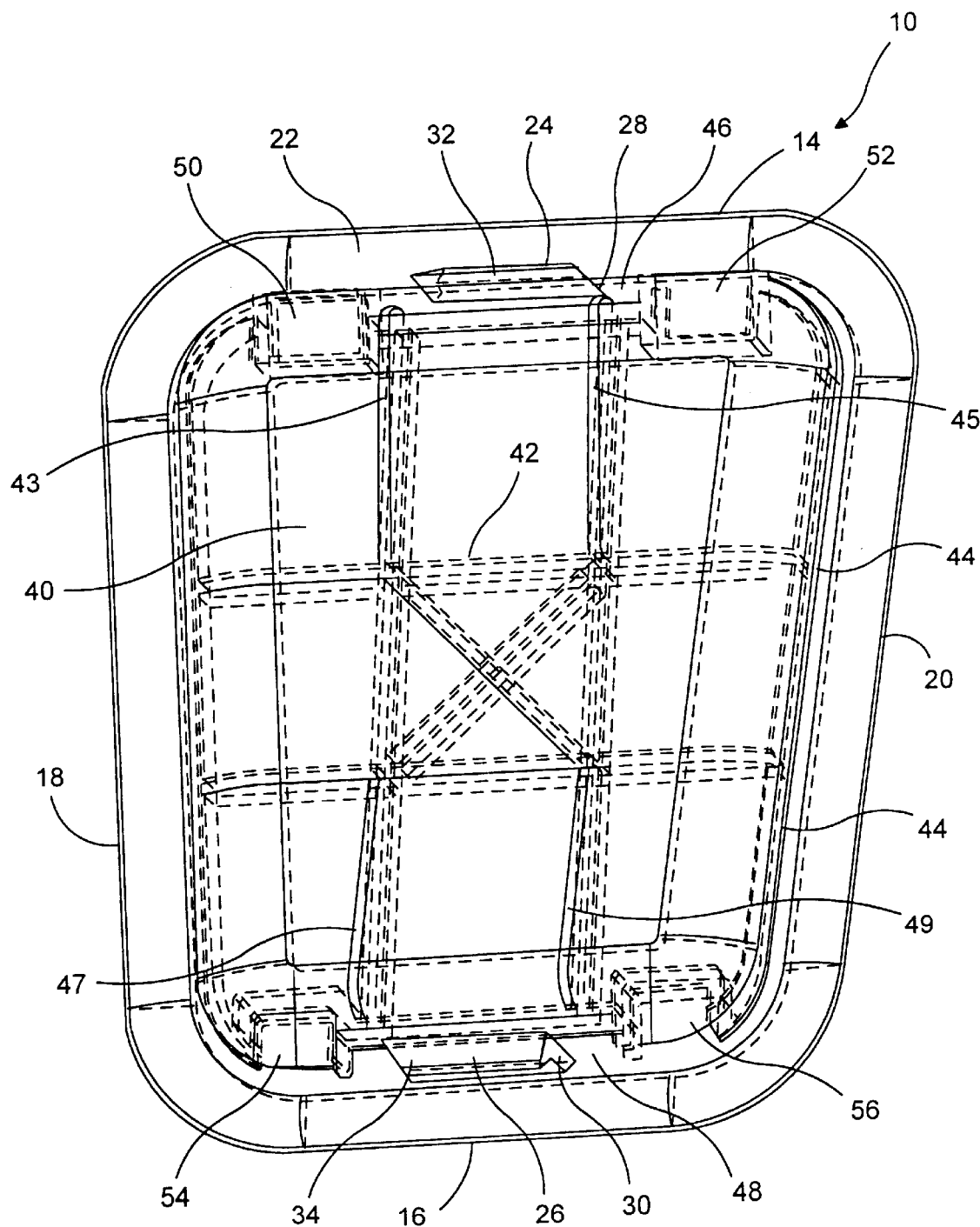
FIG. 1 is a perspective view, partially in phantom, of the hole plug of the present invention, not including the blowing adhesive gasket.
Figure 2:
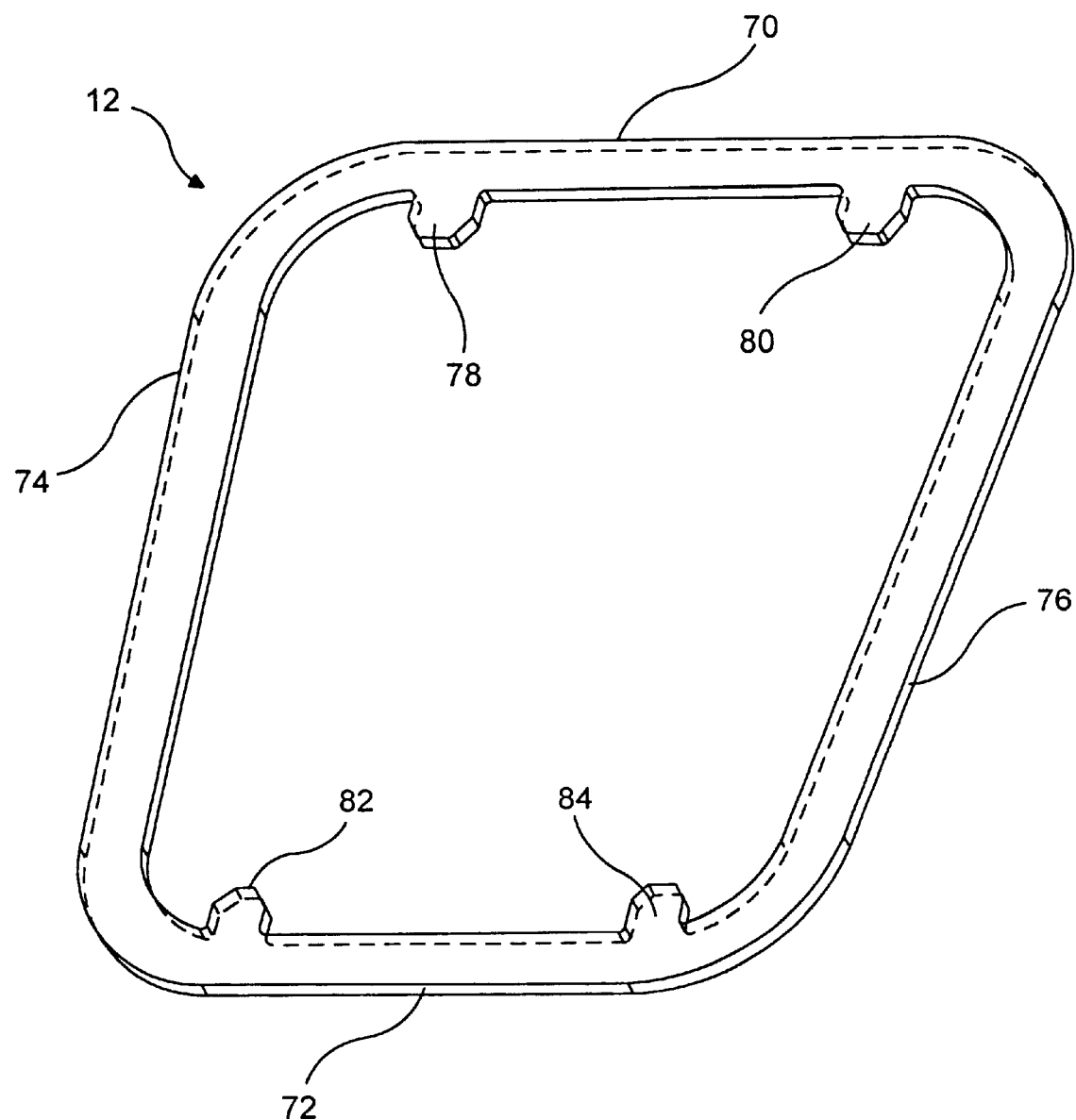
FIG. 2 is a perspective view of the blowing adhesive gasket of the present invention.

Referring now to the drawings in detail wherein like numerals indicate like elements throughout the several views, one sees that FIG. 1 is a schematic of hole plug 10 of the present invention, not including the blowing adhesive gasket 12 which is illustrated in FIG. 2. Hole plug 10, as illustrated, has upper and lower parallel walls 14, 16 and sidewalls 18, 20 which are symmetric with each other, but not parallel. However, hole plug 10 may be configured in many different shapes and many different proportions. In fact, FIGS. 6 and 7 show a hole plug 10 and corresponding blowing adhesive gasket 12 which is formed by walls 14, 16, 18, 20 of different proportions than that shown in FIGS. 1–3.

Hole plug 10 further includes a planar peripheral ledge 22 which extends about the entire periphery formed by walls 14, 16, 18, 20 of hole plug 10. Peripheral ledge 22 serves as a support for blowing adhesive gasket 12 (see FIGS. 3 and 4) and as shown in 8, peripheral ledge 22, in the installed position, is adjacently parallel to the periphery of aperture 102 of panel 100 into which hole plug 10 is installed. In this installed position, blowing adhesive gasket 12 is adhesively secured to both peripheral ledge 22 and the periphery of aperture 102 of panel 100.

Figure 6:
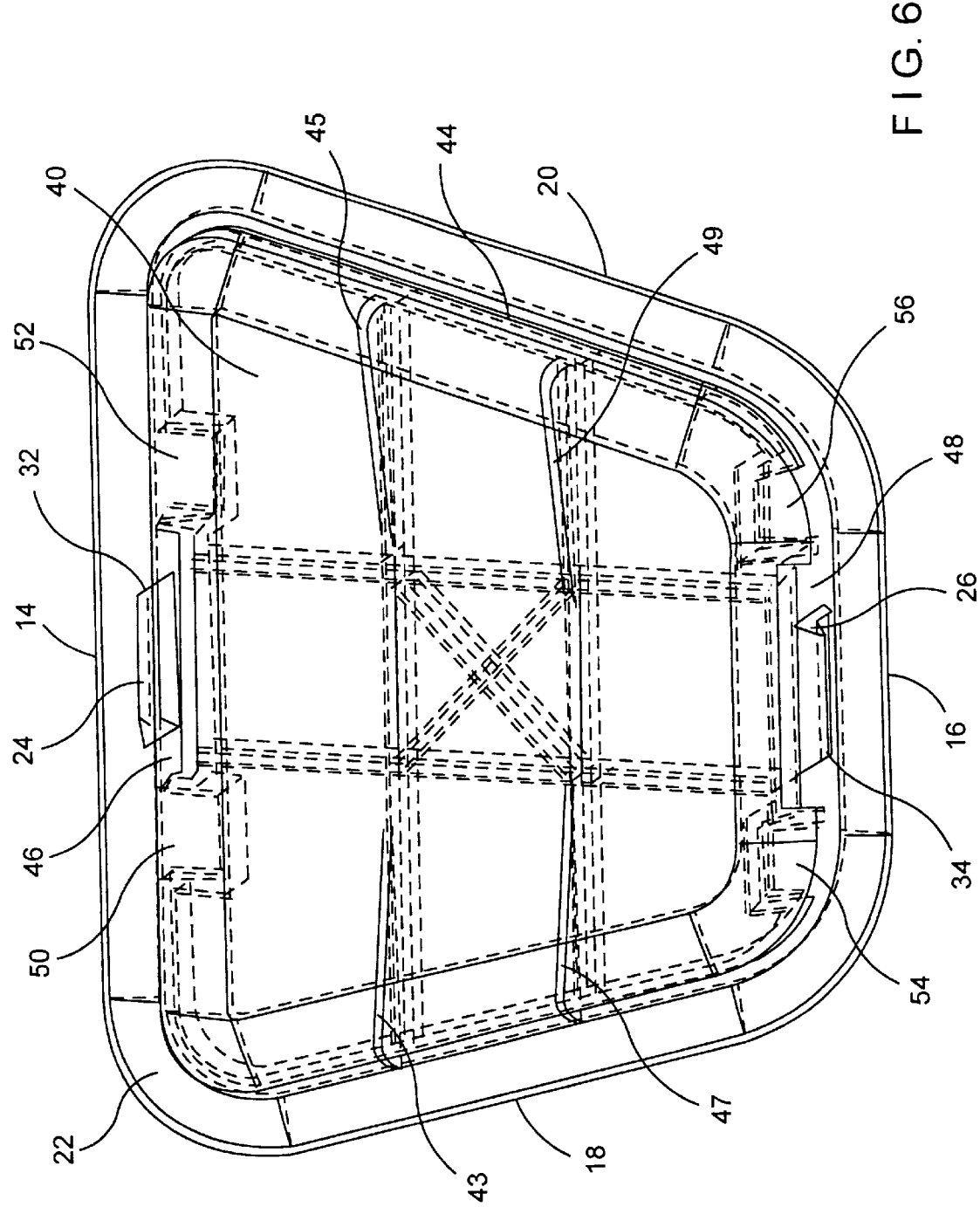
FIG. 6 is a perspective view, partially in phantom, of a further embodiment of the hole plug of the present invention, not including the blowing adhesive gasket.
Figure 7:
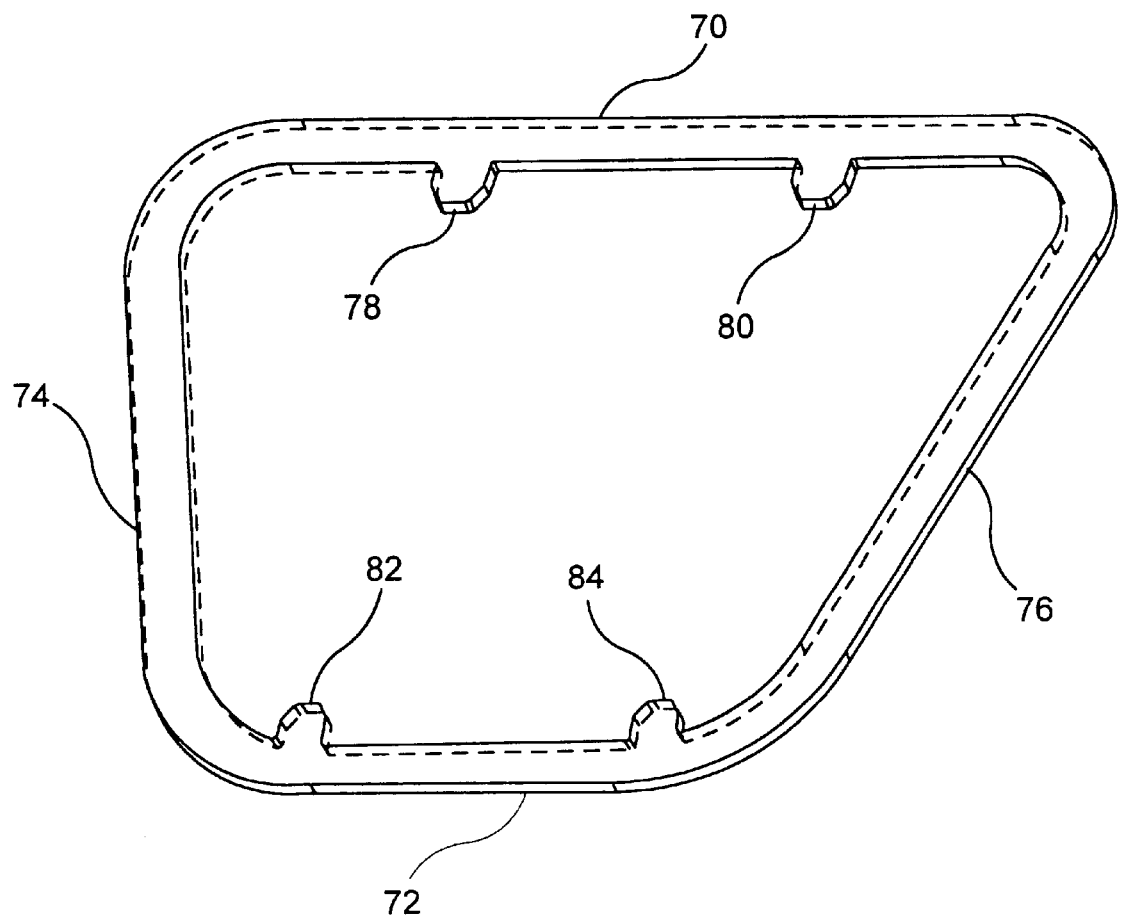
FIG. 7 is a perspective view of the blowing adhesive gasket of the further embodiment of the hole plug of the present invention.
Figure 8:
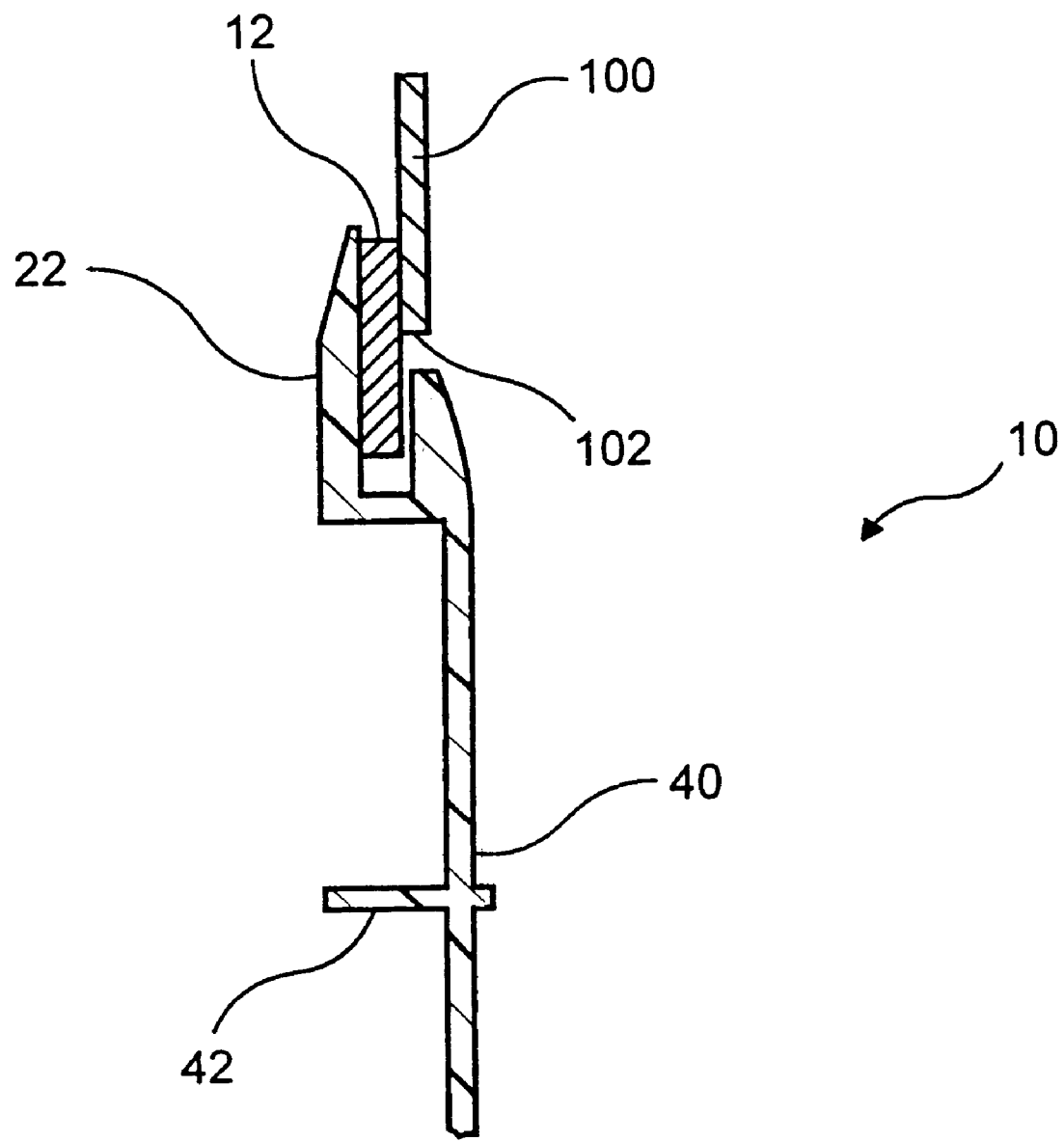
FIG. 8 is a cross-sectional view showing the arrangement of the hole plug, blowing adhesive gasket and panel after installation of the hole plug.

The interior shell portion 40 of hole plug 10, formed within the area bounded by planar peripheral ledge 22, extends outwardly so as to be raised from planar peripheral ledge 22 and further includes a supporting rib structure 42 on the underside thereof which is shown in phantom in FIGS. 1, 3 and 6 (also see FIGS. 4, 5 and 8 for cross-sectional views). Likewise, ribs 43, 45, 47, 49 are formed on the illustrated face of hole plug 10 of FIGS. 1, 3 and 6 (also see FIG. 5). The raising of interior shell portion forms wall 44 perpendicular to the innermost portion of planar peripheral ledge 22.

In a central location of upper and lower walls 14, 16, inwardly adjacent from planar peripheral ledge 22 and within recesses 46, 48 of wall 44, are formed detent elements 24, 26, respectively, which in the installed position, further engage periphery of aperture 102 of panel 100. Detent elements 24, 26 include outwardly extending stems 28, 30 and cantilevered fingers 32, 34 which are cantilevered over portions of planar peripheral ledge 22 and extend outwardly toward the edge of planar peripheral ledge 22. Outwardly extending stems 28, 30 are positioned slightly closer to the outer periphery of planar peripheral ledge 22 than is wall 44.

Pockets 52, 54 (sometimes called "doghouses") are formed through wall 44 laterally adjacent to recess 46 while pockets 56, 58 are formed through wall 44 laterally adjacent to recess 48. Pockets 52, 54, 56, 58 have floors which are coplanar with planar peripheral ledge. The pockets have a surface offset from the ledge to retain the gasket 22.

As shown in FIG. 2, blowing adhesive gasket 12 has a shape which is complementary to that of planar peripheral ledge 22 as blowing adhesive gasket 12 seats on planar peripheral ledge 22 outwardly adjacent from wall 44. As such, blowing adhesive gasket 12 includes upper side 70, lower side 72, and lateral sides 74, 76 which correspond in size and shape to the portions of planar peripheral ledge 22 formed on upper wall 14, lower wall 16 and sidewalls 18, 20, respectively. Upper side 70 includes two inwardly extending integral tabs 78, 80 (sometimes called "dogs") which are inserted into pockets 52, 54 in the installed position of FIG. 3 (hence, the "dogs" are in the "doghouses"). Likewise, lower side 72 includes two inwardly extending integral tabs 82, 84 which are inserted into pockets 56, 58 in the installed position of FIG. 3. The flexibility of blowing adhesive gasket 12 allows for easy insertion of the tabs into the pockets. Pockets 52, 54, 56, 58 are oversized to allow for the expansion of the adhesive while providing retention of hole plug 10. With tabs>78, 80, 82, 84 inserted into pockets 52, 54, 56, 58, respectively, blowing adhesive gasket 12 (initially provided as molded in a non-tacky state) can be mechanically retained by a surface offset from the ledge on hole plug 10 during shipment and assembly without the need for any type of adhesive. Thereafter, when hole plug 10 is installed through aperture 102 as shown on FIG. 8, blowing adhesive gasket 12 is adhesively affixed to planar peripheral ledge 22 and panel 100. Upon removal of hole plug 10 from aperture 102, the adhesive on blowing adhesive gasket 12 will cohesively fail between hole plug 10 and panel 100. After cohesive failure occurs, the adhesive just outside of the pockets 52, 54, 56, 58 (i.e., "doghouses") will have to be sheared between the panel 100 and the bottom of the pockets 52, 54, 56, 58.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A plug including:
    a ledge formed about a periphery of the plug;
    a wall formed inwardly adjacent from said periphery, said wall and said ledge forming an intersection inwardly adjacent from said periphery;
    a plurality of pockets formed in said wall; and
    a gasket placed on said ledge, said gasket including a plurality of tabs, said gasket being initially provided free of adhesive bonding to said ledge whereby said gasket is mechanically secured and retained by a surface offset from the ledge. to the plug by said plurality of tabs extending respectively into said plurality of pockets.

2. The plug of claim 1 wherein said gasket is adhesively bonded to said ledge after installation into an aperture in a panel.

3. The plug of claim 2 wherein said gasket is adhesively bonded to said panel proximate to said aperture after installation.

4. The plug of claim 3 further including detent elements for mechanically engaging an aperture in a panel.

5. The plug of claim 4 wherein said wall is substantially perpendicular to said ledge and said gasket seats in said intersection of said wall and said ledge.

6. The plug of claim 5 wherein-an exterior shell spans an upper section of said wall and wherein supporting ribs are formed within said exterior shell.

7. The plug of claim 6 wherein floors of said pockets are coplanar with said ledge.

8. The plug of claim 1 wherein said pockets include a floor coplanar with said ledge, and an opening formed in said wall.

\* \* \* \* \*